(12) United States Patent
Hannah

(10) Patent No.: US 6,347,013 B1
(45) Date of Patent: Feb. 12, 2002

(54) ENHANCING THE OUTPUT OF A POLARIZED LIGHT SOURCE

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/690,269

(22) Filed: Oct. 17, 2000

(51) Int. Cl.[7] .................................................. G02B 5/30

(52) U.S. Cl. ........................................ 359/495; 359/487

(58) Field of Search ................................ 359/487, 494, 359/495

(56) References Cited

U.S. PATENT DOCUMENTS 5,731,886 A * 3/1998 Taber et al. ................. 359/499

* cited by examiner

Primary Examiner—Darren Schuberg
(74) Attorney, Agent, or Firm—Trop, Pruner & Hu, P.C.

(57) ABSTRACT

A light source may enhance the generation of circularly polarized light of a desired polarization state. The light that is produced by a lamp and initially rejected by a circular polarizer may be subjected to polarization reversal. The polarization reversed light may again impinge on the circular polarizer. A substantial percentage of the previously rejected and then polarization reversed light is passed by the circular polarizer. Ultimately, a substantial percentage of the light produced by the lamp may be passed by the circular polarizer in the appropriate polarization state.

17 Claims, 1 Drawing Sheet

ENHANCING THE OUTPUT OF A POLARIZED LIGHT SOURCE

BACKGROUND

This invention relates generally to lamps that emit polarized light for example for use with reflective spatial light modulators.

Spatial light modulators may use a liquid crystal light valve to modulate light for display or projection of images. Such modulators may use reflective or transmissive technologies. Spatial light modulators may be formed on integrated circuits together with logic circuitry. Thus, integrated displays with integrated drive electronics may be formed.

As a result, spatial light modulators may be formed in a relatively cost effective fashion. Ultimately, such displays may be competitive with conventional displays such as cathode ray tubes. Generally, spatial light modulators utilize circularly polarized light which is reflected from a liquid crystal surface. That surface has its reflective properties modulated by underlying electrodes. The resulting displays may be able to modulate large light powers, without excessive heating, with reduced box sizes for the same screen size as compared to cathode ray tubes.

Reflective spatial light modulators need a bright source of circularly polarized light. Conventionally, a high pressure discharge source, such as a weakly ionized plasma, produce unpolarized light. The unpolarized light is then filtered through a circular polarizer. The polarizer transmits the circularly polarized photons and rejects photons of the opposite polarization state.

Ultimately some of the light from the light source passes outwardly for reflection from the spatial light modulator. The remaining light is trapped and absorbed inside the light source as wasted heat. Ideally, fifty percent of the amplitude of the initial light produced by the lamp can be emitted by the lamp cavity to the outside optics in the appropriate circularly polarized state. The other half of the light produced by the lamp is wasted. Thus, the light source must generate twice the amplitude that is actually used. This may result in unnecessary heating, unnecessary expense, and increased component size.

Thus, there is a need for better ways to produce a circularly polarized light source, for example in use in connection with reflective spatial light modulators.

DETAILED DESCRIPTION

Figure 1:
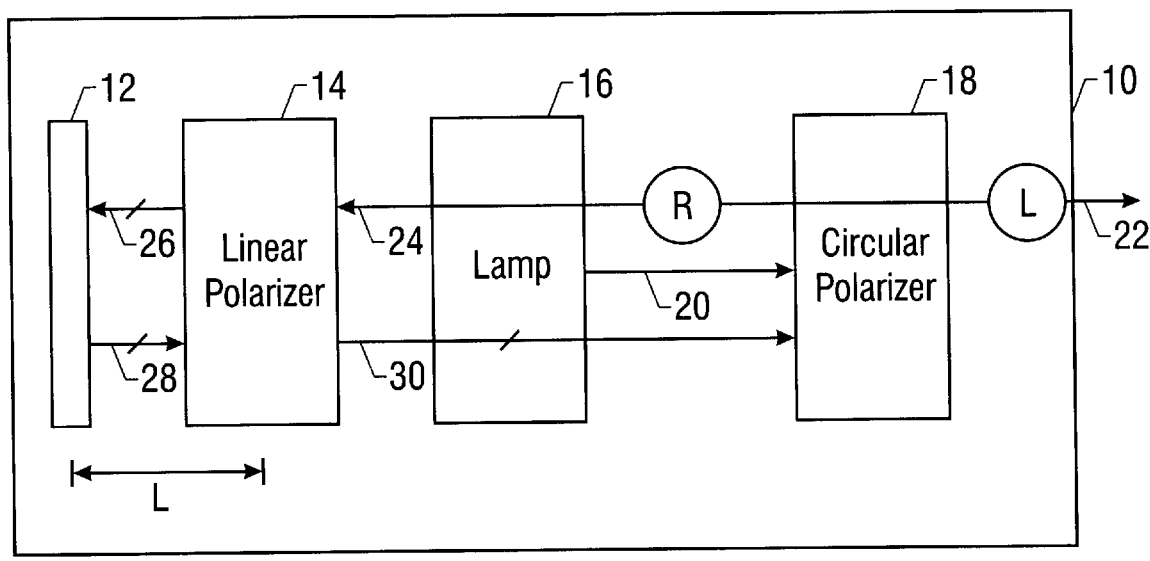
FIG. 1 is a schematic depiction of one embodiment of the present invention.

Referring to FIG. 1, a lamp 16 may be a high pressure discharge source such as a mercury arc lamp that may use a weakly ionized plasma to produce unpolarized light. The resulting light is filtered in a circular polarizer 18. The circular polarizer 18 may pass only one of two circular polarization states. In one embodiment, the circular polarizer 18 passes the left polarization state and prevents the passage of the right polarization state. Thus, the light 22 of the appropriate polarization is passed from the circular polarizer 18 for use in a suitable optical system such as a reflective spatial light modulator.

Ideally, fifty percent of the amplitude of the light produced by the lamp 16 that impinges on the circular polarizer 18 is passed in the appropriate polarization. The remaining portion of the impinging light is rejected by the polarizer 18. The rejected light, indicated at 24, may be filtered through a linear polarizer 14 that passes approximately fifty percent of the impinging light. For example, the linear polarizer 14 may be a horizontal or vertical polarizer that passes light in a horizontal or vertical polarization state. The light that passes through the linear polarizer 14, indicated at 26, is reflected from a reflector 12 which may be a simple mirror. The reflected light, indicated at 28, passes outwardly through the linear polarizer 14 since, of course, it is of the passed polarization state.

The light that passes through the linear polarizer 14 and is reflected by the reflector 12 together with the light which was rejected by the linear polarizer 14 forms the light indicated at 30. This light again impinges on the circular polarizer 18. Again, ideally fifty percent of the incident light is passed by the circular polarizer 18 because it is of the appropriate circular polarization state. The remaining, unpassed light is again reflected and undergoes the same processing described previously. Ultimately, substantially all of the light produced by the lamp 16 may eventually pass through the circular polarizer 18 in some embodiments.

The action of the reflector 12 and linear polarizer 14 effectively reverses the circular polarization imposed by the circular polarizer 18. Thus, each time half of the light is rejected by the circular polarizer 18, it's circular polarization state is reversed. Fifty percent of the rejected light, whose polarization is reversed, passes through the circular polarizer 18 on the next cycle. Ultimately, substantially all the light produced by the lamp 10 passes out of the polarizer 18 in some embodiments.

The polarization reversal is achieved because the distance L between the linear polarizer 14 and the reflector 12 is greater than the coherence length of the light involved. The coherence length is the optical propagation distance from a coherent source to a point where an electromagnetic wave maintains a specified degree of coherence. The coherence layer is approximately $\lambda^2/(n\Delta\lambda)$—where $\lambda$ is the central wavelength of the source, n is the refractive index of the medium and $\Delta\lambda$ is the spectral width of the source.

The recombined, linearly filtered light may be formed from two light paths with a net length difference longer than the coherence length of the light. As a result, the photons have a varied arrival time at the circular polarizer 18. That arrival time depends upon polarization and hence which path the photon adopted. Thus, if the distance L between the linear polarizer 14 and the reflector 12 exceeds one half the photon coherence length, and assuming no absorption of photons inside the light source 10, all of the photons created by the lamp 16 eventually exit the circular polarizer 18 with the appropriate polarization state.

Figure 2:
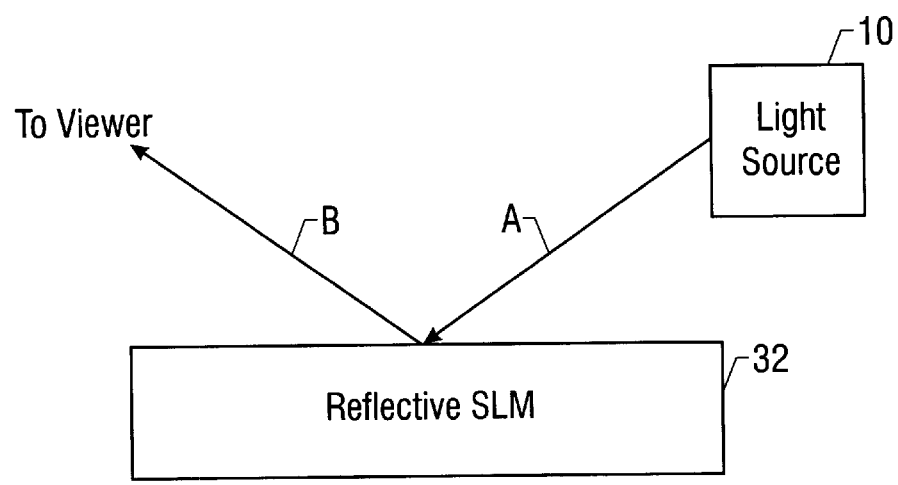
FIG. 2 is a depiction of the embodiment shown in FIG. 1 used in connection with a reflective spatial light modulator.

Referring to FIG. 2, the light source 10 may emit the circularly polarized light of the appropriate state to illuminate the reflective spatial light modulator 32. The incident light, indicated by A, is then modulated to form light beam B which may be viewed by a user or provided for projection in a projection display system.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A light source comprising:

a lamp;

a circular polarizer to pass light in one polarization state; and a linear polarizer to reverse the state of polarization of light that is not passed by said circular polarizer.

2. The light source of claim 1 wherein said lamp is a high pressure discharge lamp.

3. The light source of claim 1 including a reflective element which reflects light passed by said linear polarizer towards said circular polarizer.

4. The light source of claim 3 wherein light rejected by said circular polarizer is linearly polarized, reflected, and then passed again to said circular polarizer.

5. The light source of claim 4 wherein said reflector is a mirror positioned to reflect light passing through said linear polarizer back through said linear polarizer to impinge on said circular polarizer.

6. A reflective spatial light modulator comprising:

a light source including a lamp, a circular polarizer to pass light in one polarization state, and a linear polarizer to reverse the polarization state of light that is not passed by said circular polarizer; and a modulator to receive the light from said light source.

7. The modulator of claim 6 wherein said lamp is a high pressure discharge lamp.

8. The modulator of claim 6 including a reflective element which reflects light passed by said linear polarizer towards said circular polarizer.

9. The modulator of claim 8 wherein light rejected by said circular polarizer is linearly polarized, reflected, and then passed again to said circular polarizer.

10. The modulator of claim 9 wherein said reflector is a mirror positioned to reflect light passing through said linear polarizer back through said linear polarizer to impinge on said circular polarizer.

11. A method comprising:

generating light;

passing a first portion of said light in a first circular polarization state and a linear polarizer rejecting a second portion of said light in a second circular polarization state; and said linear polarizer reversing the polarization state of said second portion.

12. The method of claim 11 wherein passing includes causing said light to impinge on a circular polarizer that passes light in a first circular polarization state.

13. The method of claim 11 further including reflecting said linearly polarized light.

14. The method of claim 13 including causing said linearly polarized light to traverse a distance greater than the coherence length of said light.

15. The method of claim 14 including linearly polarizing said second portion to form light of first and second linear polarization states.

16. The method of claim 15 including recombining said light of said first and second linear polarization states to reverse the second circular polarization state.

17. The method of claim 16 including circularly polarizing said recombined light.

* * * * *